(12) United States Patent
Di Zanni et al.

(10) Patent No.: US 12,065,090 B2
(45) Date of Patent: Aug. 20, 2024

(54) VEHICLE PROVIDED WITH A WIRELESS CHARGER FOR MOBILE PHONES

(71) Applicant: FERRARI S.p.A., Modena (IT)

(72) Inventors: Gianluigi Di Zanni, Modena (IT); Alfonso Oliva, Modena (IT)

(73) Assignee: FERRARI S.P.A., Modena (IT)

( * ) Notice: Subject to any disclaimer, the term of this patent is extended or adjusted under 35 U.S.C. 154(b) by 570 days.

(21) Appl. No.: 17/386,889

(22) Filed: Jul. 28, 2021

(65) Prior Publication Data

US 2022/0032865 A1 Feb. 3, 2022

(30) Foreign Application Priority Data

Jul. 29, 2020 (IT) ........................ 102020000018460

(51) Int. Cl.
  *B60R 16/03* (2006.01)
  *H01F 27/22* (2006.01)
  *H02J 50/12* (2016.01)

(52) U.S. Cl.
  CPC ............. *B60R 16/03* (2013.01); *H01F 27/22* (2013.01); *H02J 50/12* (2016.02)

(58) Field of Classification Search
  CPC ........... H02J 50/12; B60R 16/03; H01F 27/22
  USPC ................................ 320/108, 109, 113, 115
  See application file for complete search history.

(56) References Cited

U.S. PATENT DOCUMENTS

| 11,159,047 | B2 * | 10/2021 | Haug | ..................... | H02J 50/005 |
| 2008/0136364 | A1 * | 6/2008 | Calvarese | ........... | H01M 10/443 |
| | | | | | 320/101 |
| 2013/0234656 | A1 * | 9/2013 | Lambert | ................ | H02J 7/0042 |
| | | | | | 320/108 |
| 2015/0057701 | A1 * | 2/2015 | Kelleher | ............ | A61H 23/0245 |
| | | | | | 606/204.15 |
| 2015/0080981 | A1 * | 3/2015 | John | ..................... | A61N 1/3785 |
| | | | | | 607/59 |

(Continued)

FOREIGN PATENT DOCUMENTS

| DE | 102014117488 A1 * | 8/2015 | ......... | B60R 11/0241 |
| JP | 2018153074 A * | 9/2018 | ................ | B60L 1/02 |

(Continued)

OTHER PUBLICATIONS

Zeng, Chinese Patent Document No. CN-110880803-A, published Mar. 13, 2020, 3 pages including English abstract. (Year: 2020).*

(Continued)

*Primary Examiner* — Phallaka Kik
(74) *Attorney, Agent, or Firm* — CANTOR COLBURN LLP (57) ABSTRACT

A vehicle having: a passenger compartment, which is designed to accommodate occupants and is provided with at least one support surface on which to place a mobile phone; and a wireless charger, which is arranged under the support surface and is designed to generate an electromagnetic field in order to charge the mobile phone placed on the support surface. The wireless charger has: at least one coil generating the electromagnetic field, a power supply circuit designed to supply power to the coil, and a heat sink emitting the heat generated by the coil and by the power supply circuit to the outside. There is at least one Peltier cell having a cool wall facing the support surface, and a hot wall facing the heat sink.

12 Claims, 9 Drawing Sheets

(56) References Cited

U.S. PATENT DOCUMENTS

| | | | |
|---|---|---|---|
| 2015/0229345 A1 | 8/2015 | Lachnitt | |
| 2017/0049611 A1* | 2/2017 | Rosh Vora | A61F 7/007 |
| 2018/0055140 A1* | 3/2018 | Antonetti | H05K 1/028 |
| 2020/0021125 A1* | 1/2020 | Thiel | H02J 7/0044 |
| 2021/0036557 A1* | 2/2021 | Haug | H01F 27/22 |
| 2021/0124019 A1* | 4/2021 | Tsai | G01S 17/894 |

FOREIGN PATENT DOCUMENTS

| | | | | |
|---|---|---|---|---|
| KR | 20170012649 A * | 2/2017 | | B60N 3/104 |
| KR | 101895052 B1 * | 9/2018 | | B60N 3/104 |
| KR | 20180102753 A * | 9/2018 | | A47G 23/0216 |
| WO | WO-2015040841 A1 * | 3/2015 | | B60H 1/00271 |

OTHER PUBLICATIONS

Lachnitt, German Patent Document No. DE-102014117488-A1, published Aug. 13, 2015, 4 pages including English abstract and 1 drawing. (Year: 2015).*

Scholz et al., German Patent Document No. DE-102016216900-B3, published Oct. 26, 2017, 5 pages including English abstract and 1 drawing. (Year: 2017).*

Sato et al., WO Patent Document No. WO-2018163711-A1, published Sep. 13, 2018, 4 pages including English abstract and 1 drawing. (Year: 2018).*

Search Report for Italian Application No. 2020000018460 completed Dec. 22, 2020.

* cited by examiner

VEHICLE PROVIDED WITH A WIRELESS CHARGER FOR MOBILE PHONES

CROSS-REFERENCE TO RELATED APPLICATIONS

This Patent Application claims priority from Italian Patent Application No. 102020000018460 filed on Jul. 29, 2020, the entire disclosure of which is incorporated herein by reference.

TECHNICAL FIELD

The invention relates to a vehicle provided with a wireless charger for mobile phones.

PRIOR ART

In modern vehicles, the presence of a wireless charger is more and more requested in order to allow users to charge a mobile phone, which simply needs to be placed close to the wireless charger.

A mobile phone has a very careful control of its own inner temperature in order to avoid damaging the battery during the charge (which is process that generates heat, especially when it is carried out in a wireless mode). As a consequence, when, during the charge, the inner temperature of the mobile phone exceeds an alarm threshold (which generally is around 33° C.), the charge is slowed down (namely, the charging power is reduced) in order to avoid an overheating. In other words, as long as the inner temperature of the mobile phone remains below the alarm threshold, the charge can take place at the maximum power (hence, with the maximum charging speed), whereas, when the inner temperature of the mobile phone exceeds the alarm threshold, the charge must be carried out at a reduced power (hence, with a reduced charging speed). Furthermore, when the inner temperature of the mobile phone is close to the alarm threshold, there can be several switches between the charge at the maximum power and the charge at the reduced power, which could even deteriorate the state of health (SohH) of the battery.

In order to try and solve the problems described above, manufacturers suggested cooling the wireless charger installed in the vehicle, for example through the forced circulation of air inside the wireless charger or around the wireless charger; however, these solutions proved to be only partially effective, as they have a limited impact on the heating of the charging mobile phone.

Patent application US2015229345A1 discloses a support device for a mobile phone, which is installed on board a vehicle; the support device also comprises a wireless charger, which is provided with a cooling device using a fan and/or a Peltier cell.

Patent application US2013234656A1 discloses a wireless charging system for a mobile phone, which is installed on board a vehicle and is provided with a forced air cooling device.

DESCRIPTION OF THE INVENTION

The object of the invention is to provide a vehicle provided with a wireless charger for mobile phones, said charger allowing a mobile phone to be charged in a wireless mode in a quick manner and without stressing the battery.

According to the invention, there is provided a vehicle provided with a wireless charger for mobile phones according to the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
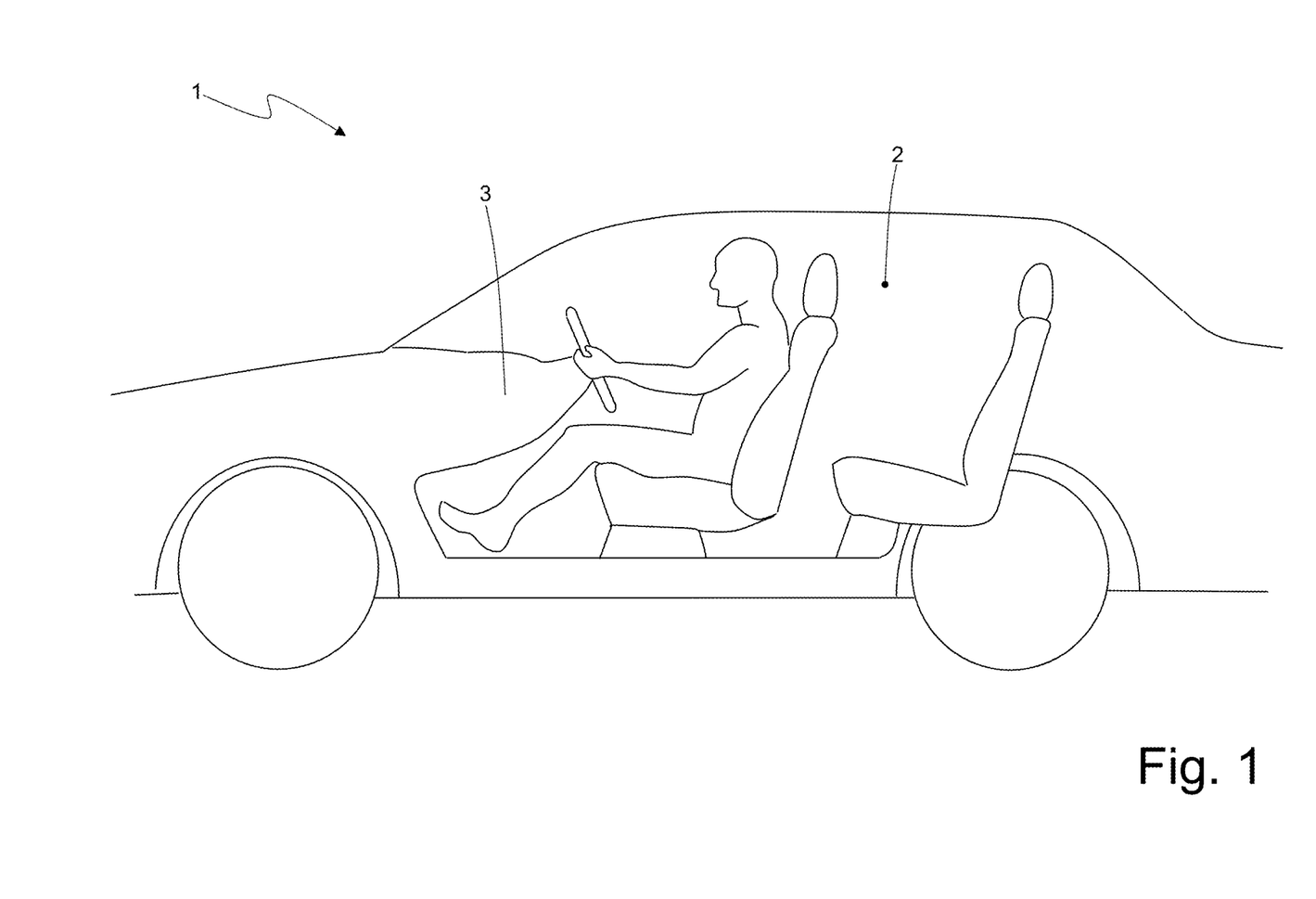
FIG. 1 is a schematic, partial view of a vehicle according to the invention.

In FIG. 1, number 1 indicates, as a whole, a vehicle provided with a passenger compartment 2, which is designed to accommodate occupants and is delimited, at the front, by a dashboard 3.

Figure 2:
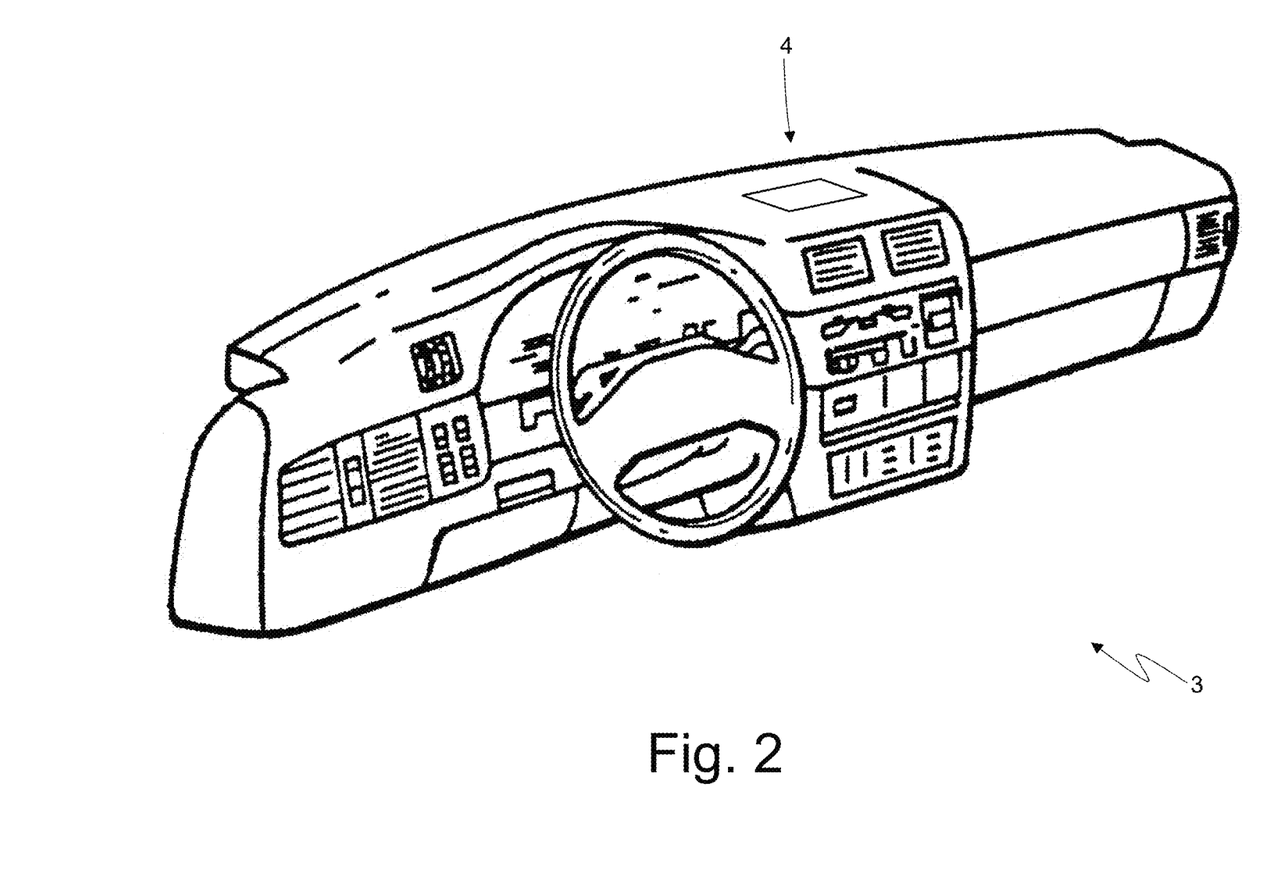
FIG. 2 is a schematic, perspective view of a dashboard of the vehicle of FIG. 1, where there is obtained a mobile phone support surface coupled to a wireless charger.

According to FIG. 2, the dashboard 3 has (at least) a support surface 4, on which to place a mobile phone 5 (schematically shown in FIGS. 3 and 5-8).

Figure 3:
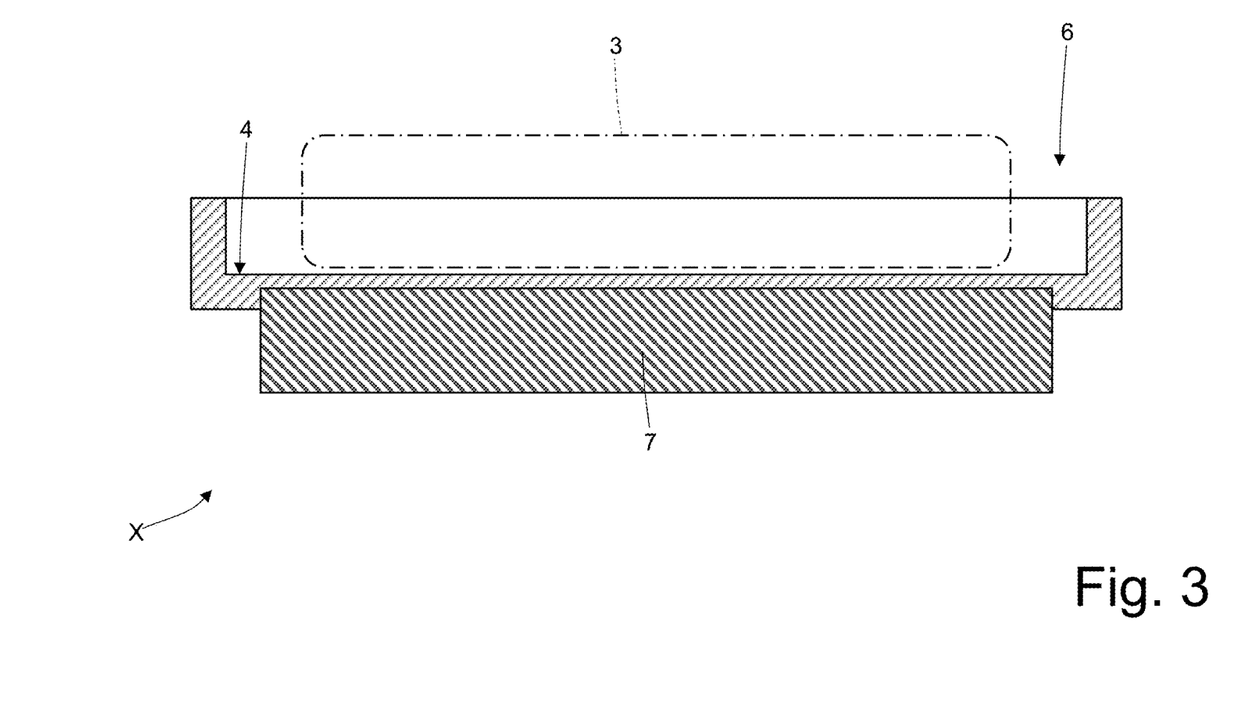
FIG. 3 is a schematic, sectional view of the support surface coupled to the wireless charger of FIG. 2.

According to FIG. 3, the support surface 4 is obtained in a cup-shaped (tub-shaped) support body 6. At the bottom of the support body 6 there is coupled a wireless charger 7, which is arranged under the support surface 4 and is designed to generate an electromagnetic field in order to charge a mobile phone 5 placed on the support surface 4.

Figure 4:
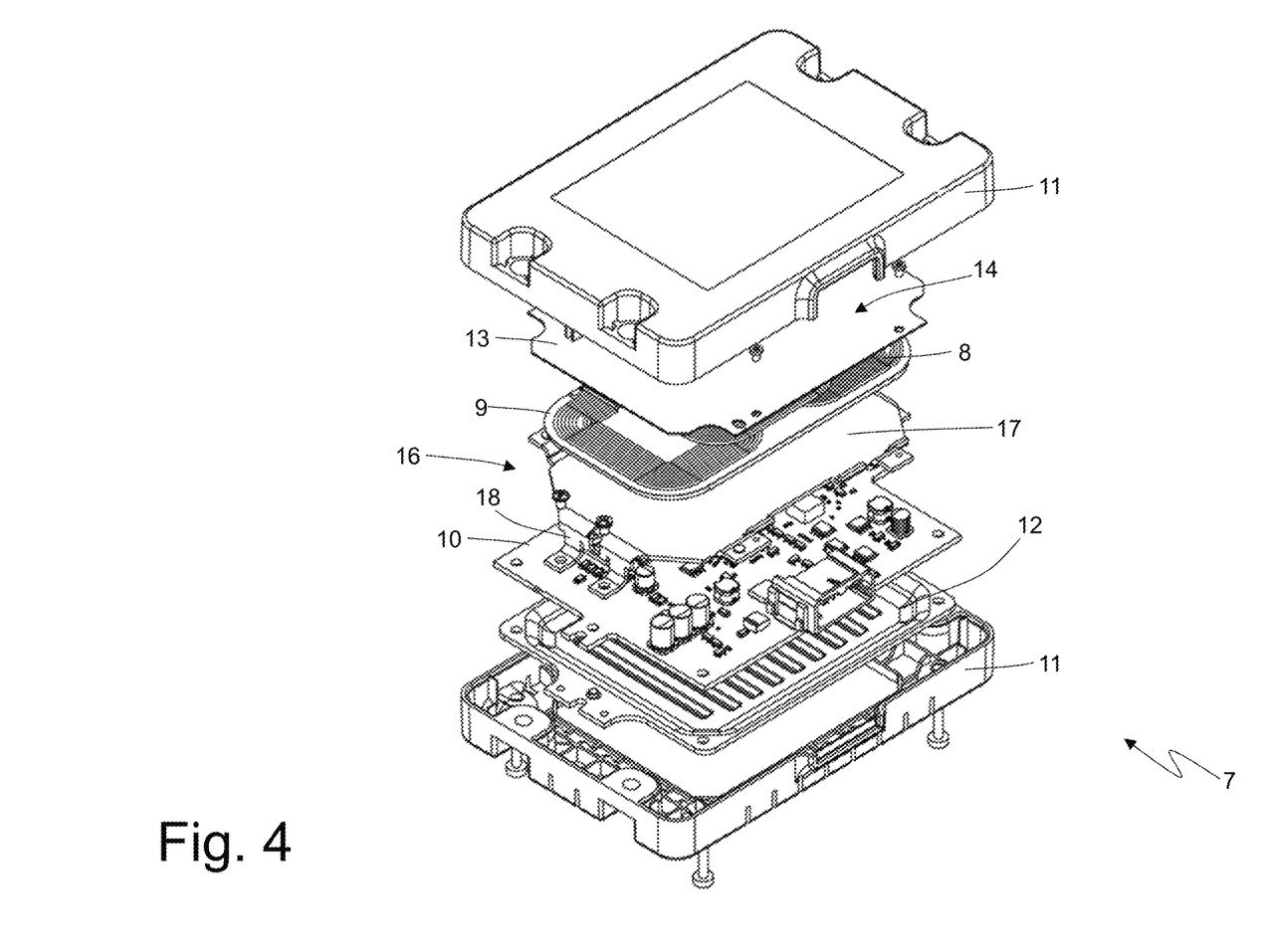
FIG. 4 is a perspective, exploded view of the wireless charger of FIG. 3.

According to FIG. 4, the wireless charger 7 comprises a plurality of coils 8, which are supported by a containing element 9 and generate the electromagnetic field in order to charge (in a wireless mode) the mobile phone 5 placed on the support surface 4; according to a different embodiment which is not shown herein, there is one single coil 8 instead of a plurality of coils 8. Furthermore, the wireless charger 7 comprises a power supply circuit 10, which is designed to supply power to the coils 8 in order to allow the coils 8 to generate the electromagnetic field. The wireless charger 7 comprises a box-shaped housing 11, which is obtaining by joining two shells and houses, on the inside, the containing element 9 carrying the coils 8 and the power supply circuit 10. The wireless charger 7 comprises a heat sink 12, which is arranged at the bottom of the housing 11 (on the opposite side relative to the support surface 4) and emits the heat generated by the coils 8 and by the power supply circuit 10 to the outside; in particular, the lower shell of the housing 11 has, at the centre, a through opening to directly expose the heat sink 12 to the outside of the housing 11. In the embodiment shown in the accompanying figures, the heat sink 12 consists of a thermally conductor plate (normally made of a metal material) having a free side facing the outside of the wireless charger 7 (namely, the facing the outside of the housing 11 of the wireless charger 7).

The wireless charger 7 comprises (at least) a Peltier cell 13 having a cool wall 14 facing the support surface 4 and a hot wall 15 facing the heat sink 12. The Peltier cell 13 is a solid-state heat pump, which, when supplied with power, absorbs heat through its cool wall 14 and releases heat through its hot wall 15, namely transfers heat from the cool wall 14 (which cools down) to the hot wall 15 (which heats up).

According to an embodiment, the power supply circuit 10 also supplies power to the Peltier cell 13, besides supplying the coils 8.

Figure 5:
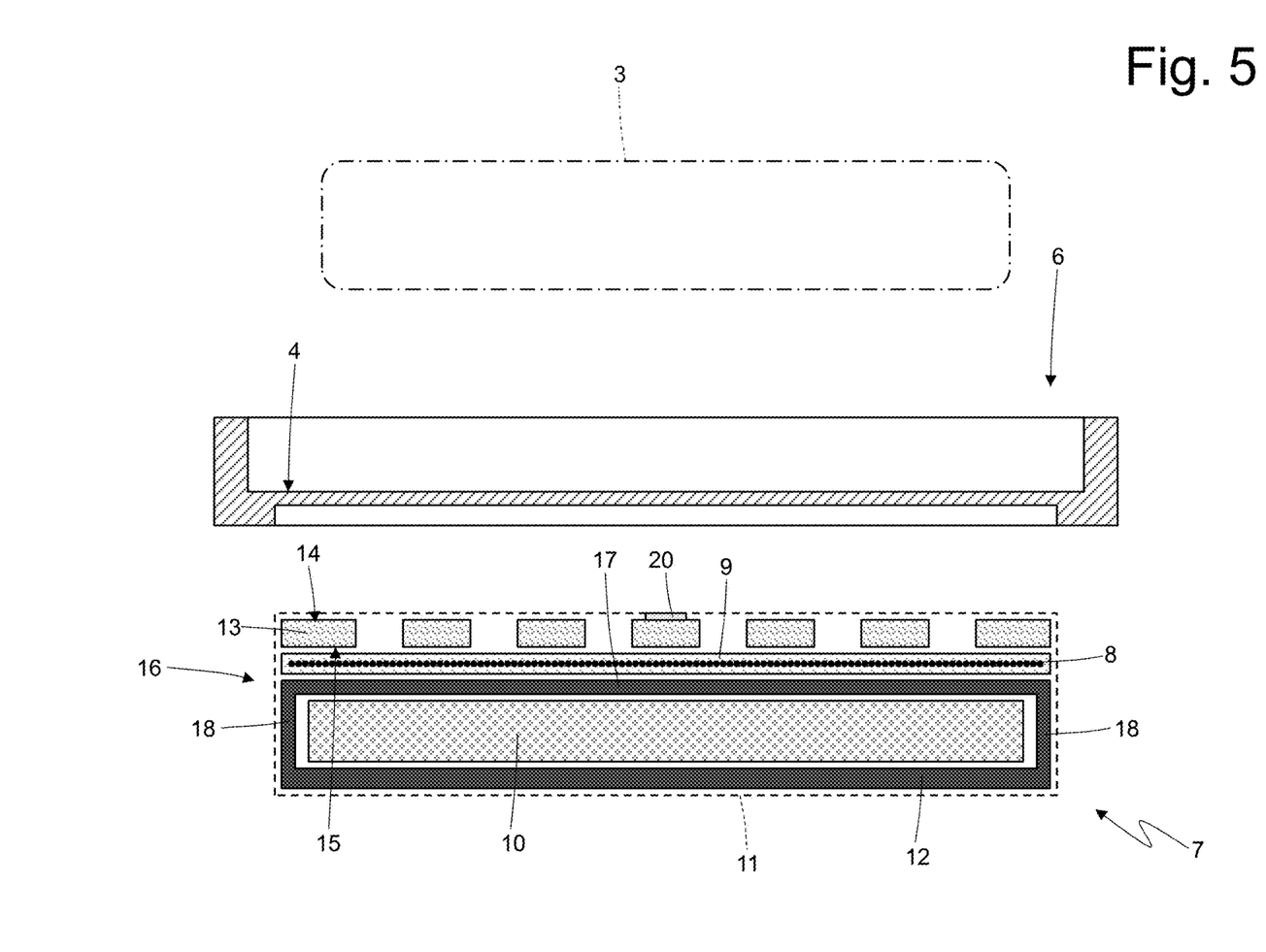
FIG. 5 is a schematic, partially exploded sectional view of the support surface coupled to the wireless charger of FIG. 2.

According to FIG. 5, the wireless charger 7 comprises (at least) a transmission element 16, which is a thermally conductor element (typically made of a metal material), at an end faces the hot wall 15 of the Peltier cell 13 and at the opposite end is in direct contact with the heat sink 12. The function of the transmission element 16 is that of conducting (transmitting) the heat coming from the hot wall 15 of the Peltier cell 13 to the heat sink 12.

In particular, in the embodiment shown in FIG. 5, the transmission element 16 is "U"-shaped and has a central wall 17, which faces the hot wall 15 of the Peltier cell 13, and two side walls 18, which are oriented perpendicularly to the central wall 17 and end in direct contact with the heat sink 12. Preferably, the power supply circuit 10 is arranged between the two side walls 18 of the transmission element 16 and, hence, in the space delimited between the transmission element 16 and the heat sink 12.

In the embodiment shown in FIGS. 3 and 5, the transmission element 16 (in particular, the central wall 17 of the transmission element 16) is in direct contact with the coils 8 (namely, with the containing element 9 where the coils 8 are arranged) and the Peltier cell 13 is arranged between the support surface 4 and the coils 8 so that the cool wall 14 of the Peltier cell 13 is as close as possible to the support surface 4.

Figure 6:
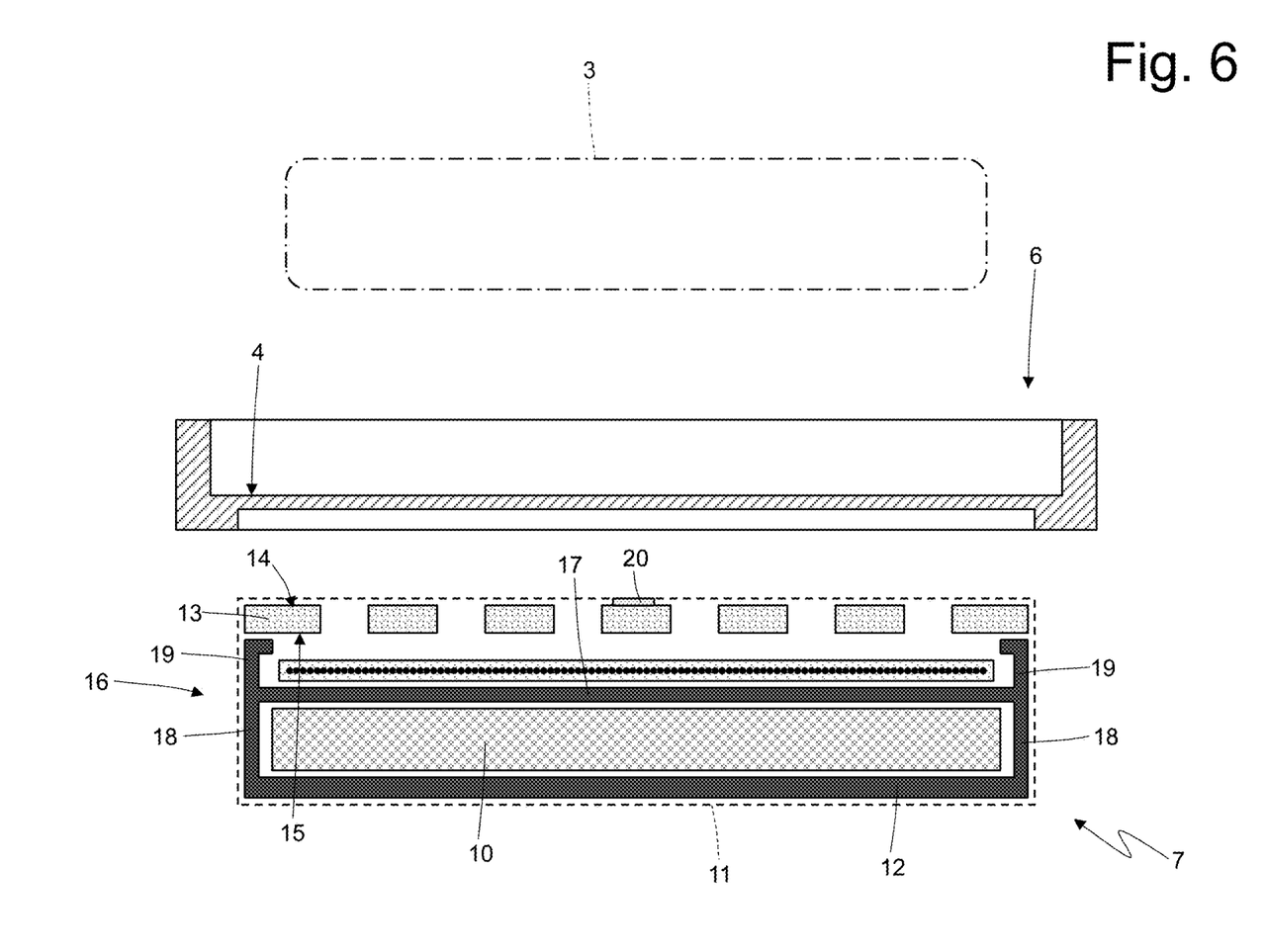
FIGS. 6, 7 and 8 are three schematic, partially exploded sectional views of respective variants of the wireless charger of FIG. 2.

In the variant shown in FIG. 6, the transmission element 16 has appendages 19 that project from the side walls 18 and touch the Peltier cell 13 (namely, end up in direct contact with the Peltier cell 13); obviously, the extension of the appendages 19 needs to be limited, in order not to screen the electromagnetic field generated by the coils 8, and needs to reach the support surface 4, in order to charge the mobile phone 5 in a wireless mode.

Figure 7:
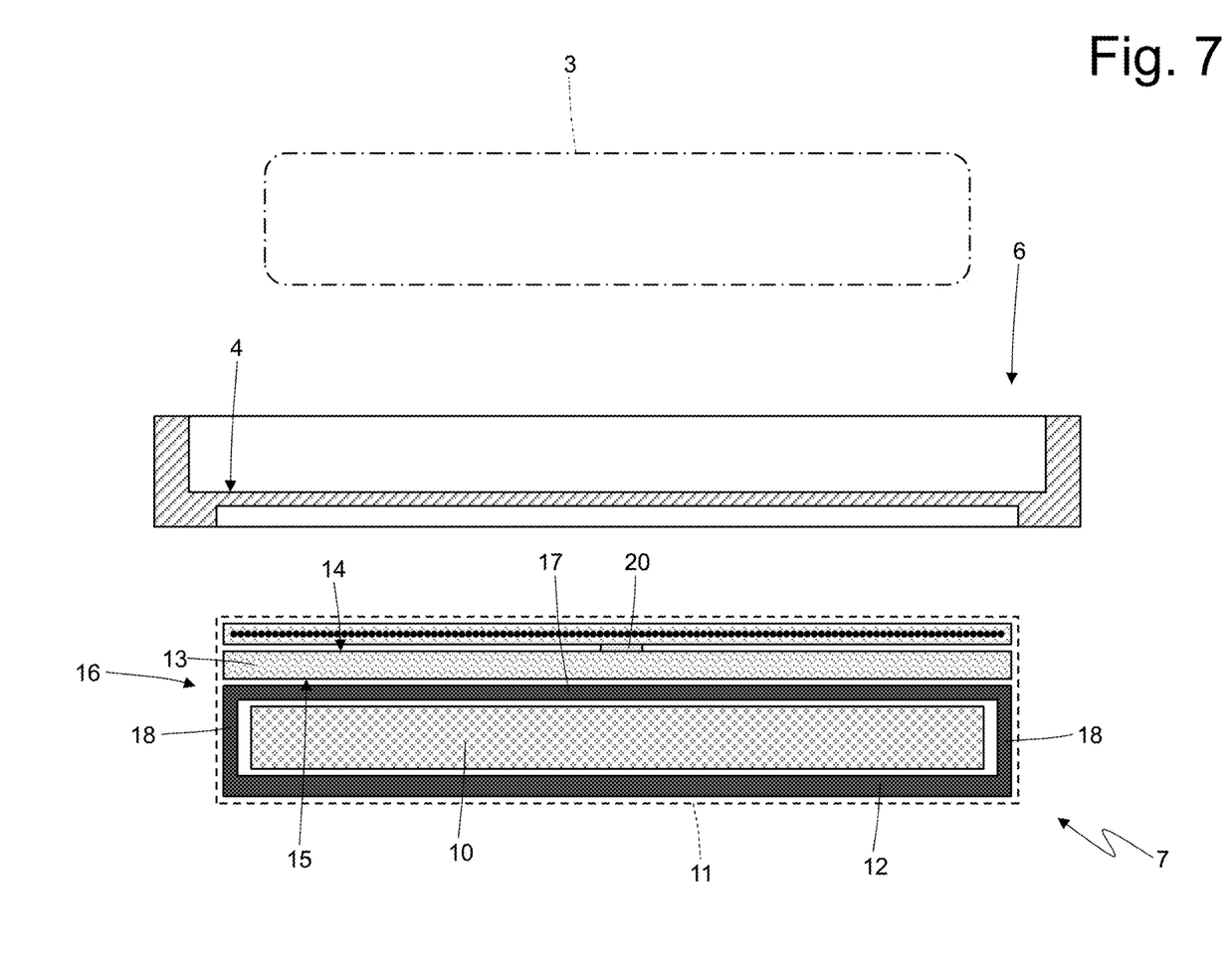

In the variant shown in FIG. 7, the transmission element 16 (in particular, the central wall 17 of the transmission element 16) is in direct contact with the with the hot wall 15 of the Peltier cell 13 and the Peltier cell 13 is arranged between the coils 8 and the transmission element 16 so that the coils 8 are as close as possible to the support surface 4.

In the embodiments shown in FIGS. 3, 5 and 6, the Peltier cell 13 is arranged as close as possible to the support surface 4 and, hence, allows for the maximum cooling of the support surface 4 (thus, limiting the heating of the mobile phone 5 during the wireless charge as much as possible); however, in these embodiments, the Peltier cell 13 is located between the support surface 4 and the coils 8 and, hence, can partially screen the electromagnetic field (or, anyway, can interfere with the electromagnetic field) generated by the coils 8, thus partially reducing the effectiveness of the wireless charge of the mobile phone 5 placed on the support surface 4. In order to prevent the Peltier cell 13 from screening or interfering with the electromagnetic field generated by the coils 8, the Peltier cell 13 can be designed (as schematically shown in figures and 6) so as to be as permeable as possible to the electromagnetic field generated by the coils 8.

In the embodiment shown in FIG. 7, the coils 8 are arranged as close as possible to the support surface 4 and, hence, the electromagnetic field generated by the coils 8 can reach the support surface 4 without screening or interferences; however, between the Peltier cell 13 and the support surface 4 there are interposed the coils 8 and, therefore, the cooling action exerted by the Peltier cell 13 upon the support surface 4 is reduced (but, however, always present and significant) compared the embodiments shown in FIGS. 3, 5 and 6.

Figure 8:
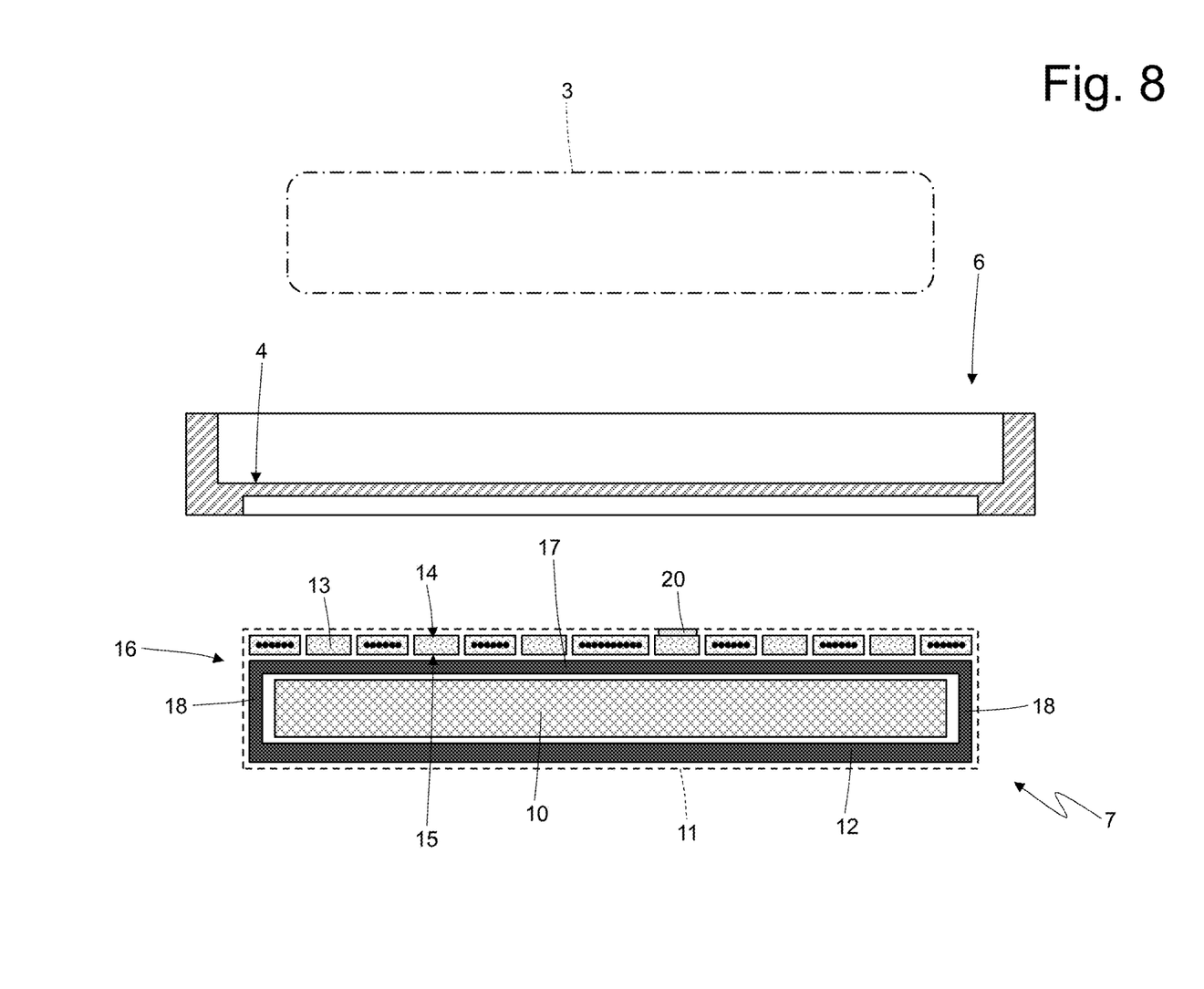

The embodiment shown in FIG. 8 is a compromise between the embodiments shown in FIGS. 3, 5 and 6 and the embodiment shown in FIG. 7: the Peltier cell 13 is coplanar to the coils 8 (namely, to the containing element 9 supporting the coils 8) and, hence, at an end, the cool wall 14 of the Peltier cell 13 and the coils 8 are as close as possible to the support surface 4, whereas, at the opposite end, the hot wall 15 of the Peltier cell 13 and the coils 8 are in direct contact with the transmission element 16 (in particular, with the central wall 17 of the transmission element 16).

According to a possible embodiment, the wireless charger 7 comprises a temperature sensor 20, which is designed to measure the temperature and is arranged between the support surface 4 and the cool wall 14 of the Peltier cell 13 (preferably, though not necessarily, the temperature sensor 20 is arranged in contact with the cool wall 14 of the Peltier cell 13). The power supply circuit 10 supplying the Peltier cell 13 requires a control unit, which is configured to control the power supply of the Peltier cell 13 based on the temperature read by the temperature sensor 20. Thanks to the presence of the temperature sensor 20, the Peltier cell 13 can be controlled in a very precise manner using a feedback control logic and, hence, constantly adjusting the action of the Peltier cell 13 to the actual cooling needs of the mobile phone 5, which is placed on the support surface 4 and is charged in a wireless manner.

The embodiments described herein can be combined with one another, without for this reason going beyond the scope of protection of the invention.

The vehicle 1 described above and provided with the wireless charger 7 has many advantages.

First of all, the vehicle 1 described above and provided with the wireless charger 7 allows the mobile phone 5 to always be charged at the maximum power possible (hence, in the shortest time possible) without significantly heating the mobile phone 5 (namely, without risking increasing the inner temperature of the mobile phone 5 above an alarm threshold, which, when exceeded, forces the mobile phone 5 to be charged at a reduced power).

This result is obtained thanks to the action of the Peltier cell 13, which moves heat from the support surface (on which the mobile phone 5 is placed) towards the heat sink 12. In other words, the Peltier cell 13 allows the support surface 4 to be cooled down heating all the rest of the wireless charger 7 (in particular, the power supply circuit 10 of the wireless charger 7). However, the transfer of heat from the support surface 4 to the rest of the wireless charger 7 does not rise any problem, since the alarm threshold of the mobile phone 5 is low (normally around 33° C.), whereas the wireless charger 7 can operate with no problems at much higher temperatures (usually up to 75° C.-85° C.). In other words, in the absence of the action of the Peltier cell 13, the support surface 4 can reach up to 40° C.-45° C. (which is too high a value to allow the mobile phone 5 to be charged at the maximum power), whereas the wireless charger 7 can internally reach up to 55-60° C.; on the other hand, in the presence of the action of the Peltier cell 13, the support surface 4 can remain at 25° C.-30° C. (which is a value that allows the mobile phone 5 to be charged at the maximum power), whereas the wireless charger 7 can internally reach up to 70-75° C. (which are temperatures that are perfectly compatible with the normal operation of the wireless charger 7).

To sum up, the purpose of the Peltier cell 13 is not that of internally cooling the wireless charger 7 (which does not need to be cooled and could easily operate even at higher temperatures), but is that of cooling the support surface 4, which is contact with the mobile phone 5, at the expenses of a greater inner heating of the wireless charger 7.

Figure 9:
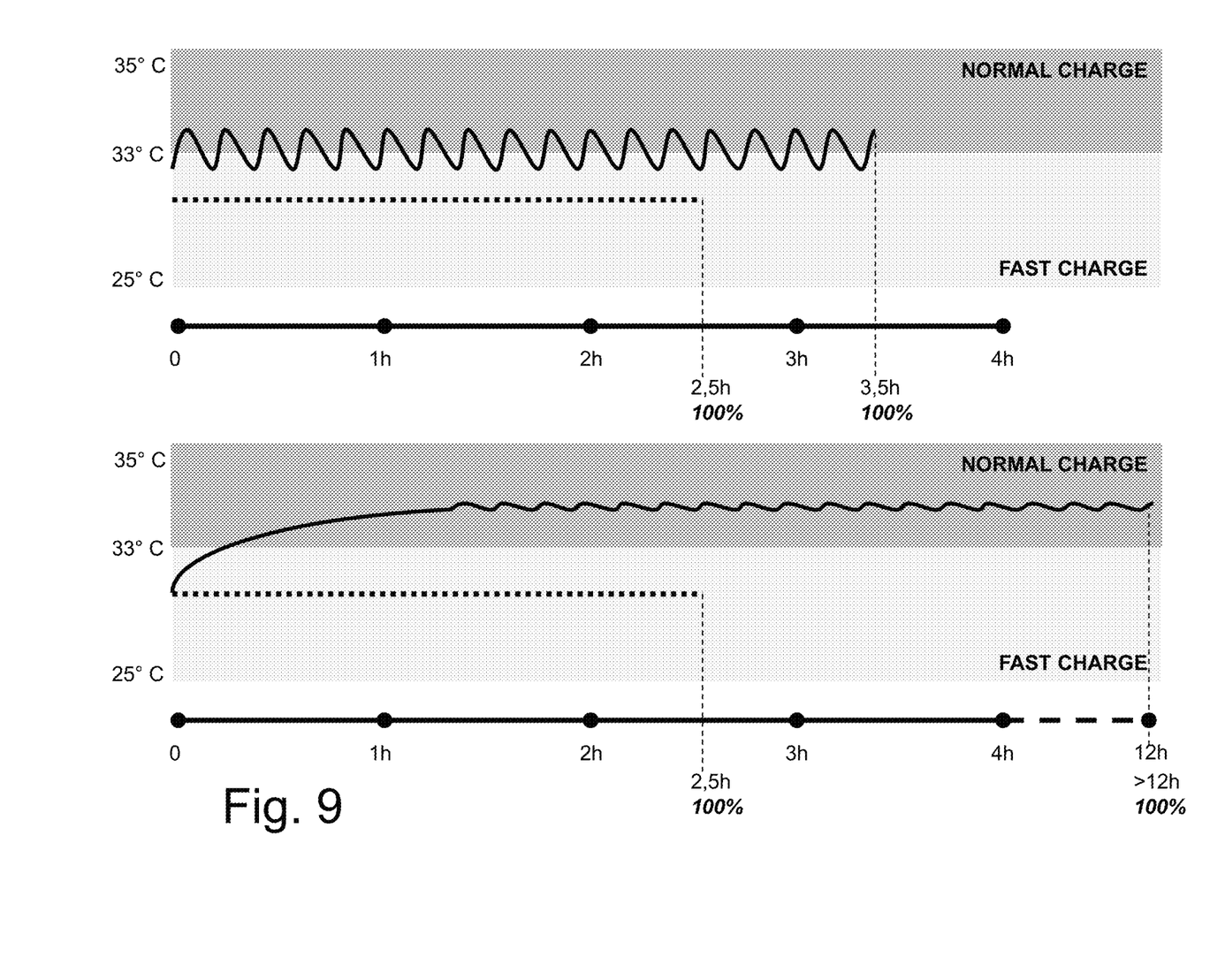
FIG. 9 contains diagrams comparing the charging times of a mobile phone with the wireless charger according to the invention and with a marketed wireless charger.

FIG. 9 shows a comparison between the charging times of a mobile phone 5 with the wireless charger 7 described above (indicated with a dotted line) and a similar marketed wireless charger (indicated with a solid line): the wireless charger 7 described above (indicated with a dotted line) allows for a much faster charge than the similar marketed wireless charger, both when the mobile phone 5 is deactivated (diagram at the top) and when the mobile phone 5 is subjected to an intensive use (bottom diagram) because of the continuous activation of audio streaming and navigation functions. In particular, in the diagrams shown in FIG. 9, the alarm threshold of the mobile phone 5 (above which the charge at the maximum speed—known as "fast charge"—of the mobile phone 5 is not possible) is equal to 33° C.: it should be pointed out that the wireless charger 7 described above allows the mobile phone 5 to always remain below the alarm threshold and, hence, to continuously use the charge at the maximum power ("fast charge"), whereas the marketed wireless charger operates to a significant extent with the charge at a reduced power ("normal charge").

Furthermore, the vehicle 1 described above and provided with the wireless charger 7 is simple and economic to be manufactured, since, compared to a similar wireless charger 7, manufacturers simply need to add the Peltier cell 13, which can easily be found in the market at relatively small costs.

LIST OF THE REFERENCE NUMBERS OF THE FIGURES 1 vehicle
2 passenger compartment
3 dashboard
4 support surface
5 mobile phone
6 support body
7 wireless charger
8 coils
9 containing element
10 power supply circuit
11 housing
12 heat sink
13 Peltier cell
14 cool wall
15 hot wall
16 transmission element
17 central wall
18 side walls
19 appendages
20 temperature sensor

The invention claimed is:

1. A vehicle comprising:
a passenger compartment, which is designed to accommodate occupants and is provided with at least one support surface on which to place a mobile phone; and
a wireless charger, which is arranged under the support surface and is designed to generate an electromagnetic field in order to charge the mobile phone placed on the support surface;
wherein the wireless charger comprises: at least one coil generating the electromagnetic field, a power supply circuit designed to supply power to the coil, and a heat sink emitting the heat generated by the coil and by the power supply circuit to the outside;
the wireless charger comprises at least one Peltier cell having a cold wall facing the support surface, and a hot wall facing the heat sink.

2. The vehicle according to claim 1, further comprising at least one transmission element, which is a thermally conductor element, at an end faces the hot wall of the Peltier cell, and at the opposite end is in direct contact with the heat sink.

3. The vehicle according to claim 2, wherein the transmission element is in direct contact with the hot wall of the Peltier cell.

4. The vehicle according to claim 2, wherein the transmission element is "U"-shaped and has a central wall facing the hot wall of the Peltier cell, and two side walls, which are oriented perpendicularly to the central wall and end in direct contact with the heat sink.

5. The vehicle according to claim 4, wherein the power supply circuit is arranged between the two side walls of the transmission element and, hence, in the space delimited between the transmission element and the heat sink.

6. The vehicle according to claim 1, wherein the heat sink consists of a thermally conductor plate having a free side facing the outside of the wireless charger.

7. The vehicle according to claim 1, wherein the Peltier cell is arranged between the coil and the power supply circuit, so that the cold wall of the Peltier cell is in direct contact with the coil.

8. The vehicle according to claim 1, wherein the Peltier cell is arranged between the support surface and the coil.

9. The vehicle according to claim 1, wherein the power supply circuit also supplies power to the Peltier cell.

10. The vehicle according to claim 1, further comprising:
a temperature sensor designed to measure a temperature and is arranged between the support surface and the cold wall or the Peltier cell; and
a control unit configured to control the power supply of the Peltier cell based on the temperature read by the temperature sensor.

11. The vehicle according to claim 10, wherein the temperature sensor is arranged in direct contact with the cold wall of the Peltier cell.

12. The vehicle according to claim 1, wherein the Peltier cell comprises a solid state heat pump, which, when supplied with power, absorbs heat through its own cold wall and releases heat through its own hot wall.

* * * * *